US007155557B2

(12) United States Patent
Meier

(10) Patent No.: US 7,155,557 B2
(45) Date of Patent: Dec. 26, 2006

(54) COMMUNICATION MECHANISM

(75) Inventor: Karl Meier, Wellesley, MA (US)

(73) Assignee: StarGen, Inc., Marlboro, MA (US)

( * ) Notice: Subject to any disclaimer, the term of this patent is extended or adjusted under 35 U.S.C. 154(b) by 135 days.

(21) Appl. No.: 10/949,851

(22) Filed: Sep. 24, 2004

(65) Prior Publication Data

US 2006/0069842 A1   Mar. 30, 2006

(51) Int. Cl.
G06F 13/00 (2006.01)
(52) U.S. Cl. .................. 710/316; 710/317; 710/240
(58) Field of Classification Search ............... 710/316, 710/317, 110, 38, 51, 52, 61
See application file for complete search history.

(56) References Cited

U.S. PATENT DOCUMENTS

| 4,852,083 | A | * | 7/1989 | Niehaus et al. ............. 370/381 |
| 5,432,708 | A | * | 7/1995 | Mohsen ........................ 716/16 |
| 5,577,204 | A | * | 11/1996 | Brewer et al. ............... 710/317 |
| 6,154,462 | A | * | 11/2000 | Coden .......................... 370/403 |
| 2003/0103501 | A1 | * | 6/2003 | Clem et al. ................... 370/389 |

OTHER PUBLICATIONS

High Performane Crossbar Switch, Xilinx, 2002.*
A 1024-Pin Plastic Ball Grid Array, Aptix Corp, 1994.*
Aptix' Corp's AX1024R, Highbeam Research, 1992.*
Definition of Field Programmable Gate Array, Wikipedia.com.*
A New Field Programmable Gate Array: Architecture and Implementation, Cho et al.1995.*

* cited by examiner

Primary Examiner—Khanh Dang
(74) Attorney, Agent, or Firm—Nields & Lemack

(57) ABSTRACT

The invention provides an interconnection architecture for semiconductor devices. Cross bar switches are traditionally placed in the center of the IC. However, this location may also be the preferred location for the centralized logic in the IC. This invention, known as a cross bar ring or CBR, provides cross bar switch functionality in a manner that can be easily distributed around the chip. Typically, it can fit in the routing channels between other functional blocks, thereby allowing other centralized functions to be placed in the center of the IC. The CBR is defined so that it can be partitioned into separate modules, which greatly aids in the placement and routing of wires. Furthermore, the architecture is defined such that the CBR can use storage elements, allowing it to be pipelined so that the wire distances can be increased while still maintaining a high internal clock speed. The use of storage elements also allows the CBR to provide a deterministic delay between any two locations on the IC, and can, if desired, insure a constant delay regardless of source and destination.

20 Claims, 4 Drawing Sheets

Block Diagram showing Placement of the Cross-Bar Ring

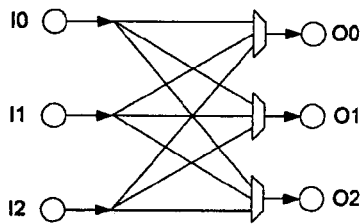
PRIOR ART
Figure 1. A Three Port Direct Wired Switch
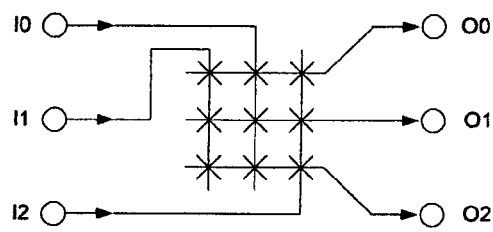
PRIOR ART
Figure 2. A Three Port Cross-Bar Switch
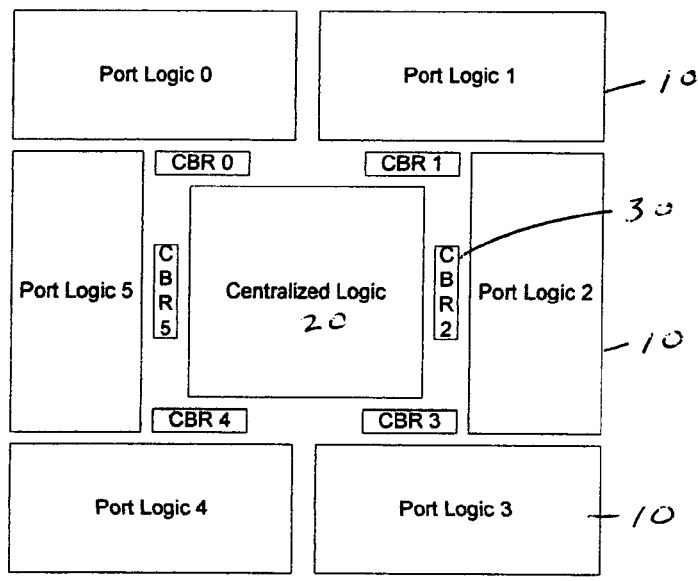
Figure 3. Physical Representation of the CBR and Other Logic in a 6-Port Switching IC

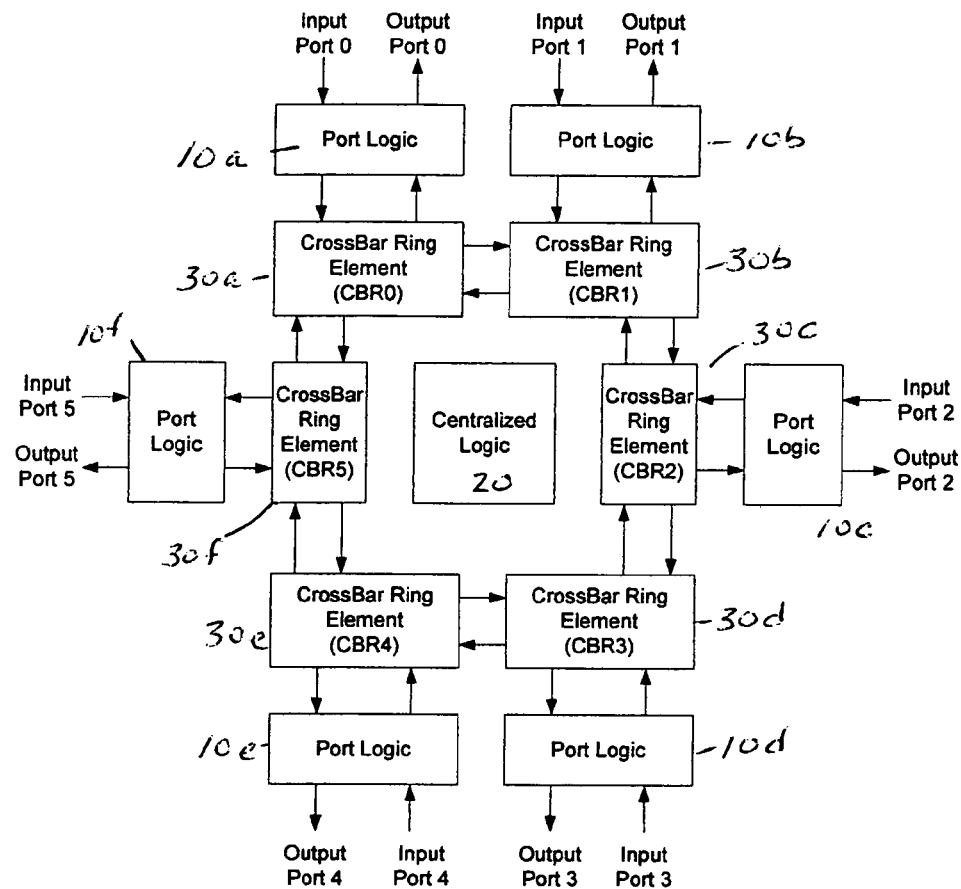
Figure 4. Block Diagram showing Placement of the Cross-Bar Ring
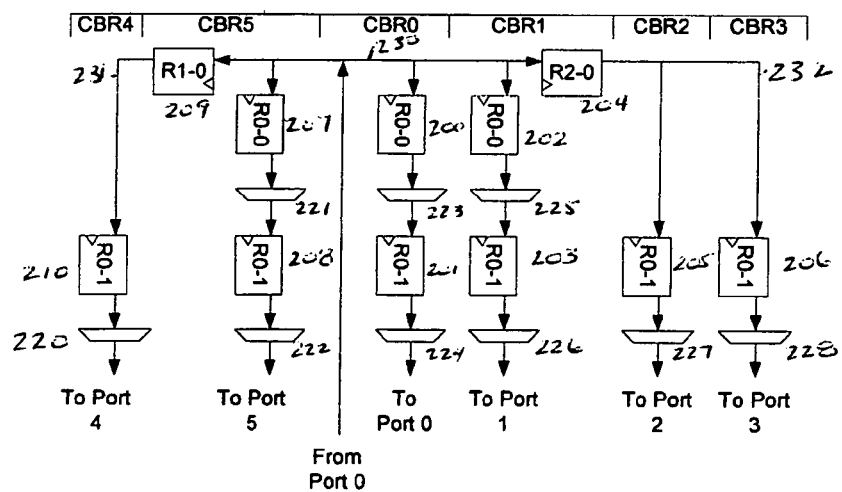
Figure 5. Logic Paths when Routing from Input Port 0 to all other Ports in a 6-Port Switch

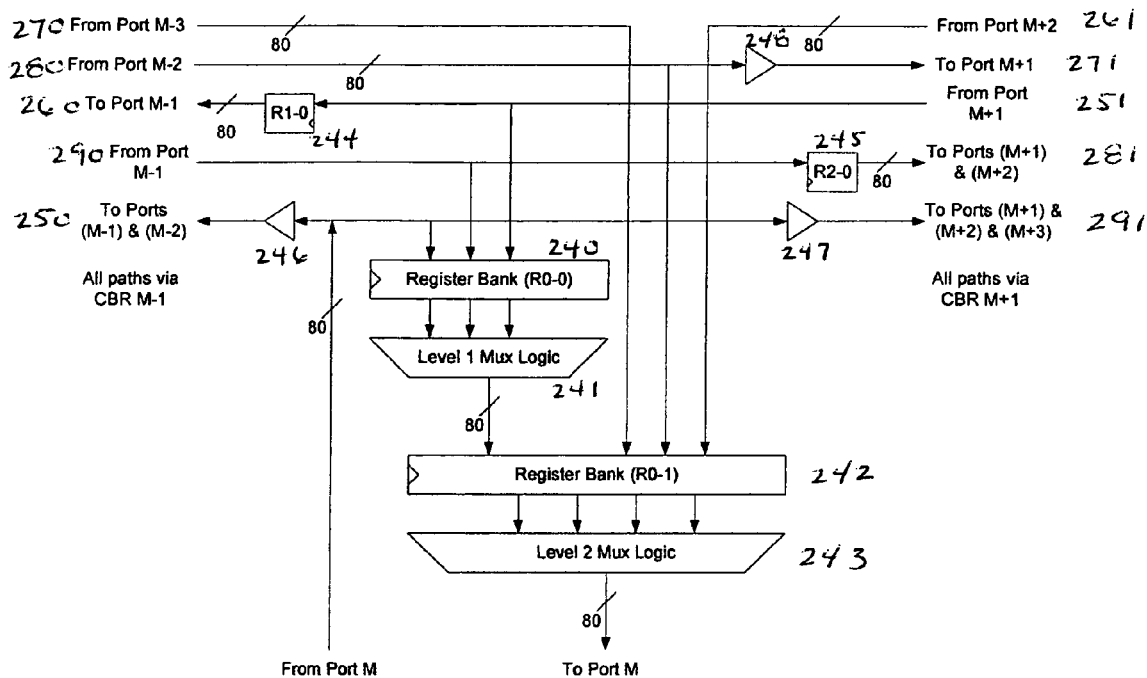
Figure 6. Cross-Bar Ring Element in a 6-Port Switch with Busses Registered Every 2 Elements

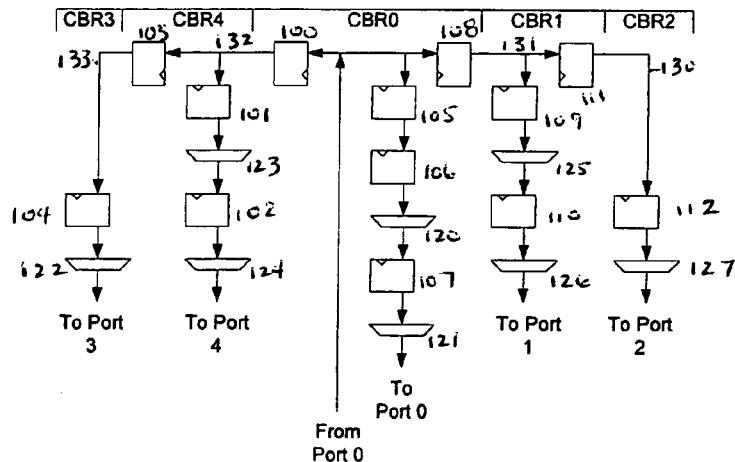
Figure 7. Logic Paths when Routing from Input Port 0 to all other Ports in a 5-Port Switch
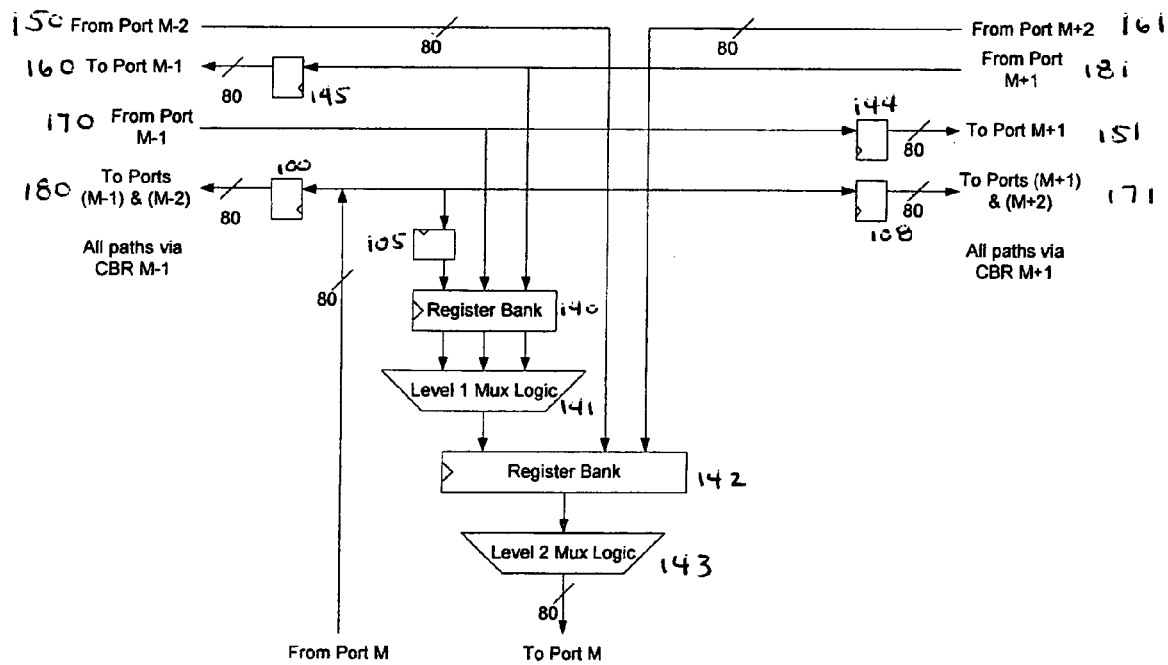
Figure 8. Cross-Bar Ring Element in a 5-Port Switch with Busses Registered Every Element

COMMUNICATION MECHANISM

BACKGROUND OF THE INVENTION

In many semiconductor integrated circuit (IC) applications, it is desirable and necessary to pass information between different, physically separate portions of the IC. For example, within a microprocessor IC, address and data paths travel between the various functional blocks, such as adders, register banks and caches. Similarly, data travels between the various ports of a network switching device. In this latter case, it is common that there are multiple sets of data traveling between various portions of the device. For example, the chip may be transmitting data from a first input port to a first output port, while it is simultaneously transmitting data between a second input port and a second output port. Therefore, there is a need to quickly and efficiently allow the movement of data between a plurality of destinations within the IC. A variety of methods have been designed to address this issue. FIG. 1 shows a simple circuit where each input is directly wired to each output. At each output, there is a multiplexer, which selects one of the inputs to present to the output. In this case, each input has a connection to each output. Thus, if there are N inputs and N outputs, a total of N*N, or $N^2$ connections, or wires, are needed. At small values of N, such as that shown in FIG. 1, this is acceptable. However, as the value of N increases, the number of wires increases exponentially, thereby becoming impractical. For example, if N is equal to three, there are only nine connections, as shown in FIG. 1. However, if N has a value of ten, one hundred connections are needed.

Large numbers of connections create complications within the IC, as there is only a limited amount of space within the IC that can be used for routing wires. In a typical semiconductor process, there are a number of layers, where some of these layers are used for the actual semiconductor devices, such as logic functions, memories, transistors and diodes, and the other layers are used to route the wires that connect these various devices together. Typically, there may be four layers within the semiconductor chip that are dedicated specifically to global routing. Also, space between functional blocks may be reserved for routing as well. This space is known as routing channels.

As the number of connections grows, the amount of space needed to route these wires grows as well. The routing layers are typically arranged such that one has all of its connections traveling in the X direction, while another has all of its connections traveling in the Y direction. Therefore, if a connection is not a straight line, it will have to use valuable space on multiple routing layers to achieve the required connection. Therefore, it is a goal of semiconductor design to keep the connections as short and as straight as possible to minimize the amount of routing space that is consumed.

To minimize the number of wires needed to connect a set of inputs to a set of outputs, a cross bar switch can be used. As shown in FIG. 2, each input is connected to a single wire, which crosses a wire associated with each output. To connect the specific input to a specific output, the switch lying at the intersection of the two wires is closed, thereby connecting the two. As can be seen in FIG. 2, the cross bar switch can significantly reduce the number of connections or wires within an IC. In this implementation, where there are N inputs and N outputs, a total of 2*N wires is needed. Thus, a cross bar switch uses N/2 times fewer wires than the directly wired circuit of FIG. 1. In the case where N is equal to three, a total of six wires are needed. In the case where N is equal to ten, a total of only twenty wires is needed, which is one fifth of the number needed by the circuit of FIG. 1. In situations where busses of 32 or 64 bits are employed, the savings are even more considerable. This represents a significant improvement over the embodiment of FIG. 1, and is therefore used in many implementations.

A second complication in the routing of wires within a IC device is timing. Each wire within an IC has a time delay, which is based on the length and width of the wire, the number of devices to which it is connected and the technology used. Therefore, as wires get longer, the delay also increases and it takes a greater amount of time for a signal to propagate from one end of the wire to the other end. Much of the logic within an IC is driven synchronously. In other words, an internal clock controls much of the logic. Typically, during each clock cycle, each functional block performs an operation such that the result is ready prior to the next clock cycle. As technology improves, these delays associated with wire lengths are proportionally larger percentage of this clock cycle. In fact, when an IC is being developed, it is common that the propagation delay of certain wires can exceed the clock cycle. As the development of the IC progresses, these longer wires must be shortened so that the delay associated with each path is less than the clock cycle. Often, this is done by modifying the logic. In extreme cases, the wire, and the delay, cannot be shortened enough. This forces the designer to change significant portions of the IC to comply with the timing requirements. These changes can force schedule delays, which are obviously undesirable.

While the cross bar switch significantly reduces the number of wires, it is not without some drawbacks. To reduce routing congestion and achieve the shortest wire lengths, the cross bar switch is preferably located in the center of the IC. This can be problematic if the chip has other centralized functions that would be best located in the center of the IC. For example, network switching Ics often have centralized functions, such as scheduling logic, and memory, that is preferably located in the center of the chip. Thus, it would be desirable to have the advantages of a cross bar switch, without having to dedicate the center of the IC to that function.

A second shortcoming of the cross bar switch is that while careful placement of the switch can help reduce wire delays, the switch cannot shorten the delays of inherently long routes, such as from one side of the IC to the other.

SUMMARY OF THE INVENTION

The problems with the prior art have been overcome with this invention, which provides an interconnection architecture for semiconductor devices. Cross bar switches are traditionally placed in the center of the IC. However, this location may also be the preferred location for the centralized logic in the IC. This invention, known as a cross bar ring or CBR, provides cross bar switch functionality in a manner that can be easily distributed around the chip. Typically, it can fit in the routing channels between other functional blocks, thereby allowing other centralized functions to be placed in the center of the IC. The CBR is defined so that it can be partitioned into separate modules, which greatly aids in the placement and routing of wires. Furthermore, the architecture is defined such that the CBR can use storage elements, allowing it to be pipelined so that the wire distances can be increased while still maintaining a high internal clock speed. The use of storage elements also allows the CBR to provide a deterministic delay between any two locations on the IC, and can, if desired, insure a constant delay regardless of source and destination.

BRIEF DESCRIPTION OF THE DRAWINGS

FIG. 1 illustrates a typical topology of a directly wired circuit of the prior art;

FIG. 2 illustrates a typical topology of a cross bar switch of the prior art;

FIG. 3 illustrates a typical physical representation of the major function blocks of a 6 port network switching IC in accordance with the present invention;

FIG. 4 illustrates a block diagram for a network switching IC in accordance with the present invention;

FIG. 5 illustrates the paths from an input port to all output ports for a 6 port network switching device in accordance with the present invention;

FIG. 6 is the schematic detail of a CBR element in accordance with the data paths shown in FIG. 5;

FIG. 7 illustrates the paths from an input port to all output ports for a 5 port network switching device in accordance with the present invention; and FIG. 8 is the schematic detail of a CBR element in accordance with the data paths shown in FIG. 7.

DETAILED DESCRIPTION OF THE INVENTION

Switches are used to logically connect a set of input ports to a set of output ports. FIG. 3 shows a typical block diagram of a network switching device. This block diagram is also a physical layout or placement of the functional blocks within the device. Around the outer ring of the chip are 6 functional blocks 10, each associated with a particular input and output port. In the case of many switches, this port logic 10 is identical for each of the ports, although there is no requirement that this be the case. The port logic typically contains functions specifically associated with a particular port, such as transceivers, logic to determine a packet's port and class, FIFOs or buffers for incoming and outgoing packets. Physically located in the center of the IC is the centralized logic 20. Typically, this block 20 contains logic that allows the separate port logic blocks 10 to operate together as a single switch. Functions such as scheduling and centralized buffering, routing tables, and register space are most typically found in this block. Typically routing channels are located between the individualized port logic blocks 10 and the centralized logic 20, where the wires that connect these various blocks together can be placed. It is in this area that the CBR elements 30 are preferably placed. In this embodiment, the CBR is broken into six identical modules, which interconnect and interact to perform a cross bar function. By partitioning the cross bar switch in this manner, it is possible to optimize the placement of the port logic 10 and the centralized logic 20, without negatively affecting the routing between these blocks.

FIG. 4 shows the data path interconnections between the various blocks shown in FIG. 3. In the preferred embodiment, each port logic block 10 has a CBR element 30 associated with it. Therefore, for a six port switching device, there are six CBR elements. However, it is within the scope of the present invention to allow multiple ports to share a single CBR element. Additionally, it is possible that a CBR element is not associated with a port. In the preferred embodiment, the Port 0 port logic 10a is in communication with CBR0 30a and with Input Port 0 and Output Port 0. CBR0 30a is in communication with the adjacent CBR elements, specifically CBR1 30b and CBR5 30f. This allows data to flow in either a clockwise or counterclockwise manner within the cross bar ring, thereby minimizing the distance and time to takes to travel from a source to a destination. While this figure shows interconnection between adjacent CBR elements, the invention is not so limited. It is also within the scope of the invention to connect the CBR elements in only one direction, such as in only the clockwise direction. Furthermore, it is possible to connect additional CBR elements together, such as CBR0 to CBR2. Finally, it is also within the scope of the invention to allow multiple port logic blocks to share a single CBR element. The preferred embodiment represents the best balance between speed, efficiency, simplicity and routing.

Returning to FIG. 4, in the preferred embodiment, communications between Input Port 0 and Output Port 2 would travel in a clockwise direction from Port Logic 10a to CBR0 30a to CBR1 30b to CBR2 30c and finally to Port Logic 10c. Similarly, communications from Input Port 5 and Output Port 3 would travel in a counterclockwise direction from Port Logic 10f to CBR5 30f to CBR4 30e to CBR3 30d to Port Logic 10d.

Finally, the centralized logic 20 resides in the center of the IC, and typically provides only control information to the rest of the logic blocks, therefore no data path connections are shown.

While FIG. 3 shows only six ports, this architecture can be readily adapted to any number of ports with little or no modification. Another advantage of the CBR is the ability to define the timing delays associated with traversing the ring. Based on the designer's preference, the time to traverse the ring can be made uniform for all combinations of input and output ports. Alternatively, it can be designed such that shorter paths around the ring require less time. The CBR can also be designed with a variety of pipelining schemes. For example, FIG. 7 shows an embodiment of the CBR in which data is clocked into storage elements at every CBR element, while maintaining a uniform delay around the ring.

FIG. 7 shows the data paths in a five port switch that can be traversed by data originating at Input Port 0. Data enters the CBR0 from Input Port 0. It is then clocked into storage element 100 which is a part of CBR0 and is the beginning of the counterclockwise path. The data is simultaneously clocked into storage element 108 which is the beginning of the clockwise path. Finally, the data is clocked into storage element 105 which is also within CBR0. Since the data is stored in each CBR element, and the CBR is bi-directional, the longest path in a five port switch is 3 clock cycles away. To simplify the design of the scheduler, this embodiment assumes a uniform delay within the ring. Therefore, although Input Port 0 and Output Port 0 are in close physical proximity, there are 3 tiers of storage elements between Input Port 0 and Output Port 0 to conform with the maximum delay through the ring. Following storage element 105 is the second tier of storage elements 106. Between storage element 106 and storage element 107 is a multiplexer 120 which selects among the various input sources. This will be described in greater detail in connection with FIG. 8. Following storage element 107 is a second multiplexer 121, which selects the data that will be transmitted via Output Port 0.

Storage element 100 is the first stage of storage elements in the counterclockwise direction. All data destined for Port 4 and Port 3 travels through this storage element 100. After exiting storage element 100, the data proceeds to the adjacent CBR4 element. Here it is clocked into storage element 101, which is the first of two tiers of storage elements associated with Output Port 4. Multiplexer 123 selects an appropriate data source, which is then clocked into the final tier of storage elements 102. A second multiplexer 124 then selects the appropriate data source for transmission via Output Port 4. Also within this CBR4 element is storage element 103 which clocks the data before it passes to the next adjacent CBR3 element.

Continuing in the counterclockwise direction, the data exits storage element 103 and is then clocked into storage element 104, which is in the CBR3 element. Multiplexer 122 then selects the appropriate data source for transmission via Output Port 3. Thus, all data that travels in a counterclockwise direction incurs three clock cycles of delay. For data traveling from Input Port 0 to Output Port 3, the path includes storage element 100, storage element 103 and storage element 104. For data traveling from Input Port 0 to Output Port 4, the path includes storage element 100, storage element 101 and storage element 102.

The path in the clockwise direction mirrors that of the counterclockwise direction. The data path within the CBR1 element is the same as that in the CBR4 element. Storage element 109, multiplexer 125, storage element 110 and multiplexer 126 are used to guarantee the proper delay and select the appropriate output for transmission via Output Port 1. Storage element 111 clocks the data before sending it to the CBR2 element. Similarly, the data path within the CBR2 element is the same as that in CBR3, where storage element 112 and multiplexer 127 create the proper delay and select the appropriate output for Output Port 2. Therefore, the data path from Input Port 0 to any of the five output ports is uniform and is exactly three clock cycles.

FIG. 7 specifically illustrates the paths from Input Port 0 to all of the Output Ports. However, in the preferred embodiment, the paths from each of the other input ports to the various output ports would be identical. In other words, data from any input port would travel through an identical path to reach the output ports.

While uniformity of delay within the CBR is not a requirement of this invention, it simplifies the design of the scheduler. Since all paths are identical in time, the scheduling logic can ignore any time delay and simply use the source and destination ports in determining which data to schedule for transmission next. In this manner, the scheduling logic simply insures that packets entering the CBR during the same clock cycle have different source and destination ports. While it is possible to have different delays through the CBR, it complicates the design of the scheduling logic. In that case, the scheduling logic would have to use the source port, the delay through the CBR and the destination port to insure that there was no conflicting traffic. For example, a packet P already in the CBR may be scheduled to exit via Output Port 0 in 2 clock cycles. The scheduling logic would need to insure that any new packet entering the CBR on this clock cycle would not be exiting the CBR via Output Port 0 at the same time as packet P. While this is certainly possible, a constant delay through the CBR is a simpler approach.

Using FIG. 7 as a reference, it is possible to define the design and functionality of each CBR element. FIG. 8 shows the schematic embodiment of the data paths shown in FIG. 7. Those elements which are identical to those in FIG. 7 will be given the same reference designators. As before data enters via Input Port 0. This data is then clocked into three sets of storage elements, one for the use within CBR0, one for the counterclockwise direction, and one for the clockwise direction. As shown in FIG. 8, the output from storage element 100 travels to CBR4, where it will be used for Output Port 4 and Output Port 3. In this case, wire 180 is analogous to wire 132 in FIG. 7. Similarly, the output from storage element 108 travels to CBR1, where it will be used for Output Port 1 and Output Port 2. Thus, wire 171 is analogous to wire 131 in FIG. 7. The data is also clocked into storage element 105, which then enters storage element 140. With respect to data from Input Port 0, storage element 140 corresponds to storage element 106 in FIG. 7. The output from storage element 140 then enters multiplexer 141. This multiplexer 141 selects an output from one of several sources. This multiplexer 141 corresponds to multiplexer 120 with respect to input data from Input Port 0.

There are a number of methods that can be used to control the multiplexer selection. In the preferred embodiment, the data that traverses the CBR is accompanied by control information. When the packet is prepared for transmission around the CBR, control information is appended to it. This control information may include information such as, but not limited to, the source port, the destination port, and the traffic class. The format of this information can vary. For example, in the preferred embodiment, a bit map is used to represent the destination ports, with each bit representing a potential destination port. In this way, a multicast packet is sent once by the source, which appends the appropriate control information. This control information would have each bit associated with a port in the multicast group set to one. As it traverses the CBR, each intended destination port will see its respective bit set and accept the packet. In another embodiment, the destination port can be encoded simply as a binary field. This is the most efficient encoding scheme if multicast is not supported.

Alternatively, the multiplexers can be controlled centrally by the scheduling logic. In this embodiment, the scheduling logic is in communication with all of the multiplexers in all of the CBR elements. In this embodiment, the central scheduler tracks the data that is traversing the CBR and selects the appropriate multiplexer outputs to ensure that data is delivered to the correct destinations.

Returning to FIG. 8, the multiplexer 141 will select the output from storage element 105 if the incoming data from Input Port 0 is intended for Output Port 0. If the incoming data from Input Port 4 is intended for Output Port 0, the multiplexer 141 will select the center input, which is the incoming data from Input Port 4. Similarly, if the incoming data from Input Port 1 is intended for Output Port 0, the multiplexer 141 will select the rightmost input.

The output of the multiplexer 141 then provides the input to storage element 142. Finally, multiplexer 143 selects between the three inputs for the appropriate data to transmit via Output Port 0. The remaining two inputs for multiplexer 143 are from Input Port 3 and Input Port 2. With respect to data from Input Port 0, storage element 142 is analogous to storage element 107 in FIG. 7 and multiplexer 143 is analogous to multiplexer 121 in FIG. 7.

The reference designators correspond to the reference designators used in FIG. 7, where FIG. 8 refers to CBR0. As can be seen by FIG. 7, data from Input Port 0 travels to every other port via storage elements 100, 103, 108 and 111. Similarly, although not shown in FIG. 7, data from all other input ports travels to Output Port 0. The other storage elements shown in FIG. 8 are from these other Input Ports.

Wire 150, which represents data from Input Port 3, directly communicates with storage element 142. Referring back to FIG. 7, the path from Input Port 3 to Output Port 0 is identical to that from Input Port 0 to Output Port 2, in that both paths are two cycles to the right. Thus, wire 150 is analogous to wire 130 shown in FIG. 7. Similarly, with respect to data originating from Input Port 3, storage element 142 is analogous to storage element 112 and multiplexer 143 is analogous to multiplexer 127.

Wire 170, which represents data from Input Port 4, communicates with storage element 140 and storage element 144. The path from Input Port 4 to Output Port 0 is identical to that from Input Port 0 to Output Port 1, in that both paths are one cycle to the right. Thus, wire 170 is analogous to wire 131 shown in FIG. 7. Similarly, with respect to data originating from Input Port 4, storage element 140 is analogous to storage element 109, multiplexer 141 is analogous to multiplexer 125, storage element 142 is analogous to storage element 110 and multiplexer 143 is analogous to multiplexer 126. Finally, storage element 144 is analogous with storage element 111 in FIG. 7, in that both lead to the adjacent CBR element. Thus, with respect to data originating from Input Port 4, wire 151 is analogous to wire 130 in FIG. 7.

Wire 180 represents data leaving CBR0 and bound for CBR4 and is analogous to wire 132 in FIG. 7.

Wire 160 represents data that is bound for CBR4, having arrived at CBR0 from CBR1.

Wire 161 represents data originating from Input Port 2. As described above, the data path for data arriving at Output Port 0 from Input Port 2 is identical to that of data originating at Input Port 0 and destined for Output Port 3, in that both are two cycles to the left. Thus, wire 161 is analogous to wire 133 in FIG. 7, and storage element 142 is analogous to storage element 104 in FIG. 7. Finally, with respect to data originating from Input Port 2, multiplexer 143 is analogous to multiplexer 122 in FIG. 7.

Wire 181 represents data originating from Input Port 1. Using the same logic as above, this data path is identical to that of data originating at Input Port 0 and destined for Output Port 4. Thus, wire 181 is analogous to wire 132. In FIG. 7, wire 132 is in communication with storage element 103 and storage element 101. Similarly, wire 181 is in communication with storage element 145 and storage element 140. Likewise, storage element 142 is analogous to storage element 102, and multiplexers 141 and 143 are analogous to multiplexers 123 and 124.

Wire 151 represents data originating from Input Port 4 and entering CBR 1.

Wire 171 represents data originating from Input Port 0 and entering CBR1.

In comparing FIG. 7 with FIG. 8, it can be seen that in both figures, there are two paths which pass through one storage element and one multiplexer. Similarly, in both figures, there are two paths which pass through two storage elements and two multiplexers. Finally, there is a single path, namely CBR0, which passed through three storage elements and two multiplexers.

Thus, each of the elements and its function within the CBR element of FIG. 8 has been explained as it relates to the data path shown in FIG. 7. In order to create a complete Cross Bar Ring, five of the CBR elements of FIG. 8 must be connected together. To do so, wire 151 of CBR 0 is connected to wire 150 of CBR1. Similarly, wire 171 of CBR1 is connected to wire 170 of CBR1. Wire 160 of CBR1 is connected to wire 161 of CBR0. Finally, wire 180 of CBR1 is connected to wire 180 of CBR0. This connection scheme is repeated for each adjacent CBR element, with CBR4 being connected to CBR0 in the same fashion.

One of the advantages of the cross bar ring is the ability to modify the number of ports, as well as the clock cycle delay around the ring. FIG. 7 and FIG. 8 illustrated a CBR with 5 ports, where there was a storage element in each CBR element.

FIG. 5 and FIG. 6 illustrate a second embodiment of the CBR. In these figures, the CBR utilizes 6 ports, where there is a storage element in every two elements. Referring to FIG. 5, the data paths for data originating at Input Port 0 and traveling to all other Output Ports is shown. Since the switch has an even number of ports, the data paths are no longer symmetric as they were in FIG. 7. In this case, there are two CBR elements to the left of CBR0, while there are three elements to the right. Therefore, the path from Input Port 0 to Output Port 3 will determine the number of clock cycles in the CBR. Since storage elements are introduced in every two CBR elements, the total number of clock cycles around the CBR will be two.

Having determined the maximum delay path through the CBR, it is possible to configure the remainder of the data path from Input Port 0 to the other Output Ports. Since storage elements are added in every two CBR elements, CBR0 and adjacent elements CBR1 and CBR5 each require two tiers of storage elements. As was explained in relation to FIG. 7, multiplexers are also needed to select the proper output. Thus, the data path to Output Port 0 contains storage element 200, multiplexer 223, storage element 201 and multiplexer 224. Similarly, the data path to Output Port 1 contains storage element 202, multiplexer 225, storage element 203 and multiplexer 226, while the path to Output Port 5 contains storage element 207, multiplexer 221, storage element 208 and multiplexer 222.

Since CBR4 and CBR2 are two elements away, a storage element is added in the ring before the data enters these elements. In the counterclockwise direction, storage element 209 is used, while in the clockwise direction storage element 204 is used. Since these storage elements provide one clock cycle delay, the remaining CBR elements need only introduce one additional tier of storage elements. In the CBR4 element, storage element 210 and multiplexer 220 are used in conjunction with storage element 209 to form the data path to Output Port 4. Similarly, in the CBR2 element, storage element 205 and multiplexer 227 are used in conjunction with storage element 204 to form the data path to Output Port 2. Lastly, in the CBR3 element, storage element 206 and multiplexer 228 are used in conjunction with storage element 204 to form the data path from Input Port 0 to Output Port 3.

FIG. 6 illustrates the design of one of the six CBR elements, specifically CBR0, used to implement the data path shown in FIG. 5. The other five CBR elements are identical and each connects to the two adjacent CBR elements.

In the same manner as was explained in reference to FIG. 7 and FIG. 8, FIG. 6 illustrates the various data paths within the CBR. Data from Input Port 0 is in communication with buffer 246, buffer 247 and storage element 240. Since the buffers do not affect the data path, these elements are not shown in FIG. 5. However, storage element 240 is analogous to storage element 200, which is the first stage of storage elements for CBR0. Similarly, multiplexer 241, storage element 242 and multiplexer 243 are analogous to multiplexer 223, storage element 201 and multiplexer 224, respectively. Wire 250 is the counterclockwise data path to Output Port 4 and Output Port 5, while wire 291 is the clockwise data path to Output Port 1, Output Port 2 and Output Port 3.

Wire 290 represents the data path originating at Input Port 5. As explained above, this is analogous to the path from Input Port 0 to Input Port 1, as both are one element apart. Wire 290 is in communication with storage element 245, which is analogous to storage element 204 with respect to data originating from Input Port 5. It is also in communication with storage element 240, which is analogous to storage element 202. Thus, multiplexer 241, storage element 242 and multiplexer 243 are analogous to multiplexer 225, storage element 203 and multiplexer 226 with respect to data from Input Port 5. The output from storage element 245 is wire 281, which is analogous to wire 232 in FIG. 5.

Wire 280 represents the data path for data originating at Input Port 4. As before, the data path from Input Port 4 to Output Port 0 is analogous to the path from Input Port 0 to Output Port 2. Therefore, wire 280 is analogous to wire 232 in CBR2 and is in communication with storage element 242, which is analogous to storage element 205, and continues into the adjacent CBR element via buffer 248 and wire 271. Finally, multiplexer 243 is analogous to multiplexer 227 in FIG. 5.

Wire 270 represents the datapath for data originating at Input Port 3, which is three elements to the left. This is analogous to the path from Input Port 0 to Output Port 3, shown in FIG. 5. Wire 270 is analogous to wire 232 in CBR3, with storage element 242 being analogous to storage element 206, and multiplexer 243 being analogous to multiplexer 228.

Wire 261 represents the datapath for data originating at Input Port 2, which is two elements to the right. This is analogous to the path from Input Port 0 to Output Port 4. Thus, wire 261 is analogous to wire 231 in FIG. 5, with storage element 242 and multiplexer 243 being analogous to storage element 210 and multiplexer 220, respectively.

Finally, wire 251 represents the datapath for data originating at Input Port 1, which is one element to the right. This is analogous to the path from Input Port 0 to Output Port 5. Thus wire 251 is analogous to wire 230 in CBR5. Thus, storage element 244, which leads to the adjacent CBR element to the left, is analogous to storage element 209. Wire 260, which leads to the adjacent CBR element is analogous to wire 231 in FIG. 5. Similarly, storage element 240, multiplexer 241, storage element 242 and multiplexer 243 are analogous to storage element 207, multiplexer 221, storage element 208 and multiplexer 222, respectively.

The CBR element of FIG. 6 is replicated six times to form the complete cross bar ring. In connecting the adjacent CBR elements, wire 291 of CBR0 is connected to wire 290 of CBR1. Wire 281 of CBR0 is connected to wire 280 of CBR1. Wire 271 of CBR 0 is connected to wire 270 of CBR1. Wire 260 of CBR1 is connected to wire 261 of CBR0, and wire 250 of CBR1 is connected to wire 251 of CBR0.

These connections are repeated for each adjacent CBR element, with CBR5 connecting back to CBR0.

The CBR allows packets originating at one port to be sent to a destination port. In the preferred embodiment, the time delay from the input to the destination is a constant, which simplifies the scheduling logic. It is also possible to have multiple packets traversing the CBR simultaneously, as long as multiple packets are not destined for the same port at the same time. The following Table 1 illustrates how representative packets traverse the CBR.

TABLE 1

Packets in CBR

| Input Cycle | Packet ID | Input Port | Output Port | Output Cycle |
|---|---|---|---|---|
| 0 | P0 | 2 | 4 | 2 |
| 1 | P1 | 4 | 4 | 3 |
| 1 | P2 | 5 | 2 | 3 |
| 2 | P3 | 0 | 4 | 4 |
| 3 | P4 | 1 | 4 | 5 |
| 3 | P5 | 3 | 1 | 5 |

The above table illustrates a total six packets entering the CBR during a period of four clock cycles. This table is for illustrative purposes only and is not meant to limit the invention. In fact, under certain conditions, it is possible for 24 packets to enter a six element CBR during a period of four clock cycles.

Referring to Table 1, the input port of each packet is shown in the third column, while its output port is shown in the fourth column. In this embodiment, the CBR introduces a two clock cycle delay between the source and destination ports for all traffic patterns. As seen in the fourth column, the CBR is capable of routing packets such that an output port is generating a new output every clock cycle. In table 1, Output Port 4 outputs packets P0, P1, P3 and P4 on successive clock cycles. This table also shows that a number of packets can be traversing the CBR simultaneously. For example, during clock cycle 2, packet P0 is being output on Output Port 4, packets P1 and P2 are traversing the CBR and packet P2 is entering the CBR via Input Port 5.

As can be seen in the Table 1, it is possible to introduce numerous packets into the CBR simultaneously and to have multiple packets traversing the CBR at once. The only restrictions are that multiple packets cannot enter the same input port simultaneously, and multiple packets cannot exit the same output port simultaneously.

In this embodiment, all paths in the CBR require two clock cycles. This simplifies the design of the scheduling logic. Typically, the scheduling logic can select one packet from each input port to insert into the CBR during each clock cycle. Since all paths in the CBR are the same duration, the scheduling logic simply compares the destination port of each packet requesting entry into the CBR. If it is different from the destination ports of the other packets scheduled to enter the CBR, then it can be inserted during the current clock cycle.

The operation of the CBR will be explained using the traffic pattern shown in Table 1. Table 2 shows the location of each packet during each clock cycle. The various designations in the first column of the table, such as 240, 242, 244 and 245 refer to the elements shown in FIG. 6.

TABLE 2

Example packets flowing through the CBR

| | Cycle | | | | | |
|---|---|---|---|---|---|---|
| | 0 | 1 | 2 | 3 | 4 | 5 |
| CBR 0 | | | | | | |
| R0-0 (240) | | P2 | P3 | P4 | | |
| R1-0 (244) | | | | P4 | | |
| R2-0 (245) | | P2 | | | | |
| R0-1 (242) | | P0 | P1 | | | P5 |

TABLE 2-continued

Example packets flowing through the CBR

| | Cycle | | | | | |
|---|---|---|---|---|---|---|
| | 0 | 1 | 2 | 3 | 4 | 5 |
| Port-2 CBR 1 | | | | | | |
| R0-0 (240) | P0 | | P3 | P4 | | |
| R1-0 (244) | P0 | | | | | |
| R2-0 (245) | | | P3 | | | |
| R0-1 (242) | | | P1, P2 | | P5 | |
| Port-2 | | | | | | P5 |
| CBR 2 | | | | | | |
| R0-0 (240) | P0 | | | P4, P5 | | |
| R1-0 (244) | | | | P5 | | |
| R2-0 (245) | | | | P4 | | |
| R0-1 (242) | | | P1, P2 | P3 | | |
| Port-2 | | | | P2 | | |
| CBR 3 | | | | | | |
| R0-0 (240) | P0 | P1 | | P5 | | |
| R1-0 (244) | | P1 | | | | |
| R2-0 (245) | P0 | | | | | |
| R0-1 (242) | | | P2 | P3 | P4 | |
| Port-2 | | | | | | |
| CBR 4 | | | | | | |
| R0-0 (240) | | P1, P2 | | P5 | | |
| R1-0 (244) | | P2 | | | | |
| R2-0 (245) | | | | P5 | | |
| R0-1 (242) | | P0 | P1 | P3 | P4 | |
| Port-2 | | | P0 | P1 | P3 | P4 |
| CBR 5 | | | | | | |
| R0-0 (240) | | P1, P2 | P3 | | | |
| R1-0 (244) | | | P3 | | | |
| R2-0 (245) | | P1 | | | | |
| R0-1 (242) | | P0 | | | P4, P5 | |
| Port-2 | | | | | | |

From Table 1, it can be seen that packet P0 enters the CBR at Input Port 2, located in the CBR2 element. From there, the packet is clocked into storage element 240 of CBR2 and is transmitted to the CBR1 element via wire 250 and to the CBR3 element via wire 291. Wire 250 from CBR2 is connected to wire 251 of CBR1. Packet P0 then travels via wire 251, where it is clocked into storage element 240 and storage element 244 in CBR1. Wire 291 from CBR2 is connected to wire 290 of CBR3. Packet P0 also travels via wire 290, where it is clocked into storage element 240 and storage element 245 in CBR3. All of these actions occur during the first clock cycle, as shown in the second column of Table 2.

During the next clock cycle, the packet P0 is further propagated throughout the cross bar ring. Returning to CBR2, multiplexer 241 does not select packet P0, since it is not destined for Output Port 2. This determination can be based on control information traveling with packet P0, or by the scheduling logic controlling the individual multiplexers, as explained earlier. Thereafter, there is no further propagation of packet P0 in the CBR2 element, as shown in the third column of Table 2

In CBR1, the packet P0 was clocked into storage element 240 and storage element 244 during the first clock cycle. Similar to what occurred in CBR2, multiplexer 241 does not select packet P0, since there P0 is not destined for Output Port 1. Thus, there is no further propagation of packet P0 within CBR1. The output of storage element 244 travels via wire 260 to CBR0. Wire 260 of CBR1 connects to wire 261 from CBR0. Once within CBR0, the packet P0 is clocked into storage element 242 during the next clock cycle, as shown in the third column of Table 2.

In CBR3, the packet P0 was clocked into storage element 240 and storage element 245. As above, multiplexer 241 does not select packet P0 since it is not destined for Output Port 3. Thus, there is no further propagation of packet P0 within CBR3. The output of storage element 245 travels via wire 281 to CBR4. Wire 281 of CBR3 connects to wire 280 of CBR4. Once within CBR4, the packet P0 is clocked into storage element 242. It also travels via wire 271 to CBR5. Wire 271 of CBR4 is connected to wire 270 of CBR5. Once within CBR5, the packet P0 is clocked into storage element 242. The various storage elements into which the packet P0 has been clocked during this clock cycle are shown in the third column of Table 2.

On the next clock cycle, the packet P0 reaches its destination, Output Port 4. There are various storage elements within the CBR that contain the packet P0. The output of storage element 242 in CBR1 is not passed by multiplexer 243, since the packet is not destined for Output Port 1. Similarly, the output of storage element 242 in CBR5 is not passed by multiplexer 241 since the packet is not destined for Output Port 5. However, the multiplexer 243 in CBR4 does pass the packet P0, since it is destined for Output Port 4. This is shown in Table 2, in the fourth column in the field labeled as CBR4 Port-2.

The paths of the other packets shown in Table 1 can be described in a similar fashion, and will not be described below. Table 2 shows the path of each packet, as well as the storage elements in which each packet was clocked. In several instances, such as in storage element 242 in CBR2 during clock cycle 2, there are multiple different packets clocked in the same element. Returning to FIG. 6, there are four separate sets of storage elements which together form storage element 242. In clock cycle 2, the set of storage elements which receives its input from wire 261 contains packet P1, while the set of storage elements which receives its input from wire 280 contains packet P2.

The fifth row of Table 2 shows that Output Port 4 transmits a packet during every clock cycle starting at the second clock cycle. Also, in clock cycle 3, the CBR3 element is storing four different packets, in various stages of delivery. This demonstrates the ability of the CBR to move multiple packets simultaneously, without conflict.

While this specification has described a cross bar ring element that has connections to an output port, an input port and to its adjacent neighbors, the invention is not so limited. The cross bar ring can also be used to provide connections to internal locations, such as register files, caches, and diagnostic ports. The structure of the element is identical in this embodiment. Rather than connecting to an input and/or output port, the element connects to an internal bus or memory structure. Thus, each CBR element can connect to other CBR elements, to input ports, to output ports and to internal device locations.

Although there are four possible types of interconnections for each cross bar ring element, all four need not be present in each element. Each cross bar ring element must have interconnections to other CBR elements, and may optionally have an interconnection with internal device locations, input ports and/or output ports. It is within the scope of the invention to have some of the cross bar ring elements have connections to only other cross bar ring elements. Similarly, it is within the scope of the invention for an element to have connections to other cross bar ring elements and to an input port or output port only. Similarly, a CBR element can have connections to other CBR elements and to internal device locations only. Finally, a cross bar ring element may have connections to multiple internal device locations, multiple input ports and/or multiple output ports.

While the present invention has been described in relation to a network switching device, the application of the invention is not so limited. Those skilled in the art will appreciate that the present invention can be used in any semiconductor application where there are a number of functional blocks between which data travels. For example, a microprocessor device contains cache elements, arithmetic units, multipliers, floating point units, instruction decoders, and other functional blocks which may all need to pass data and address information between them. As explained above, the CBR element can be used to connect to internal device locations, as well as ports. Therefore, the cross bar ring elements of the present invention can be used equally effectively to distribute data between these functional blocks.

What is claimed:

1. A switching device adapted to receive data from an input port, which is one of a plurality of input ports, and to transmit said data via an output port, selected from a plurality of output ports, comprising:
   a plurality of cross bar ring elements, wherein each of said elements comprises at least one storage element and is in communication with one of said plurality of output ports, one of said plurality of input ports, and at least two other cross bar ring elements, such that each of said cross bar ring elements is adapted to receive data from said input port and at least one of said at least two other elements and adapted to transmit data to said output port and at least one of said at least two other elements, and said storage elements within said cross bar ring elements are configured such that the number of clock cycles required to transmit data from any of said plurality of input ports to any of said plurality of output ports is constant.

2. The switching device of claim 1, wherein each of said cross bar ring elements further comprises multiplexers.

3. The switching device of claim 2, wherein said multiplexers are controlled using control information transmitted concurrently with said data.

4. The switching device of claim 3, wherein said control information comprises the destination ports via which said data will be transmitted.

5. The switching device of claim 2, further comprising centralized scheduling logic, wherein said multiplexers are controlled by said centralized scheduling logic.

6. The switching device of claim 1, further comprising routing channels, wherein said cross bar ring elements are located in said routing channels of said device.

7. The switching device of claim 1, wherein each of said plurality of cross bar ring elements is in communication with two other cross bar ring elements so as to form a ring, such that data from any of said cross bar ring elements can be transmitted to any other of said cross bar ring elements via said ring.

8. A system for transferring data between a plurality of locations within a semiconductor device, wherein at least one of said plurality of locations is the source of said data and at least one of said plurality of said locations is the destination of said data, comprising a plurality of cross bar ring elements, wherein a first of said elements is in communication with said source, a second of said elements is in communication with said destination, and each of said elements is in communication with at least two other cross bar ring elements, and said plurality of elements is in communication with said plurality of locations, wherein each of said cross bar ring elements comprises at least one storage element and is adapted to receive data from at least one of said at least two other elements and adapted to transmit data to at least one of said at least two other elements such that said plurality of cross bar ring elements forms a ring, and said storage elements within said cross bar ring elements are configured such that the number of clock cycles required to transmit data from any of said plurality of source locations to any of said plurality of destination locations is constant.

9. The system of claim 8, wherein at least one of said cross bar ring elements further comprises multiplexers.

10. The system of claim 9, wherein said multiplexers are controlled using control information transmitted concurrently with said data.

11. The system of claim 10, wherein said control information comprises the destination to which said data will be transmitted.

12. The system of claim 9, further comprising centralized scheduling logic, wherein said multiplexers are controlled by said centralized scheduling logic.

13. The system of claim 8, further comprising routing channels, wherein said cross bar ring elements are located in said routing channels of said semiconductor device.

14. The system of claim 8, wherein each of said plurality of locations is in communication with a respective one of said cross bar ring elements.

15. A method of routing data within a semiconductor device from a source, selected from a plurality of source locations to a destination, selected from a plurality of destination locations, said method comprising the steps of:
   providing a plurality of cross bar ring elements, wherein a first of said plurality of cross bar ring elements is in communication with said source, and each one of said plurality of cross bar ring elements comprises at least one storage element and is in communication with at least two others of said plurality of cross bar ring elements such that said plurality of cross bar ring elements forms a ring, and said plurality of cross bar ring elements is in communication with said plurality of source locations and said plurality of destination locations and said storage elements within said cross bar ring elements are configured such that the number of clock cycles required to transmit data from any of said plurality of source locations to any of said plurality of destination locations is constant;
   supplying data from said source to said first of said plurality of cross bar ring elements in communication with said source location;
   forwarding data from said first of said plurality of cross bar ring elements to at least one recipient, where said recipient is one of said two other cross bar ring elements in communication with said first cross bar ring element; and
   transmitting data from said first of said plurality of cross bar ring elements to said destination location if said destination is in communication with said first cross bar ring element.

16. The method of claim 15, further comprising the steps of:
   forwarding said data received by said recipient of said forwarding step to at least one of said two other cross bar ring elements in communication with said recipient; and transmitting data from said recipient to said destination location if said destination is in communication with said recipient.

17. The method of claim 16, further comprising repeating said forwarding and transmitting steps until all of said plurality of cross bar ring elements have received said data.

18. A method of routing data within a semiconductor device from a source, selected from a plurality of source locations to a destination, selected from a plurality of destination locations, said method comprising the steps of:
providing a plurality of cross bar ring elements, wherein a first of said plurality of cross bar ring elements is in communication with said source, and each one of said plurality of cross bar ring elements comprises at least one storage element and is in communication with at least two others of said plurality of cross bar ring elements such that said plurality of cross bar ring elements forms a ring, and said plurality of cross bar ring elements is in communication with said plurality of source locations and said plurality of destination locations and said storage elements within said cross bar ring elements are configured such that the number of clock cycles required to transmit data from any of said plurality of source locations to any of said plurality of destination locations is constant;
supplying data from said source to said first of said plurality of cross bar ring elements in communication with said source location;
forwarding data from said first of said plurality of cross bar ring elements to at least one recipient, where said recipient is one of said two other cross bar ring elements in communication with said first cross bar ring element, if said destination is not in communication with said first element; and
transmitting data from said first of said plurality of cross bar ring elements to said destination location if said destination is in communication with said first cross bar ring element.

19. The method of claim 18, further comprising the steps of:
forwarding said data received by said recipient of said forwarding step to at least one of said two other cross bar ring elements in communication with said recipient if said destination is not in communication with said recipient; and
transmitting data from said recipient to said destination location if said destination is in communication with said recipient.

20. The method of claim 19, further comprising repeating said forwarding and transmitting steps until said data has reached said destination.

* * * * *